June 15, 1926.
H. Y. CARSON
PIPE JOINT
Filed August 18, 1922
1,588,444
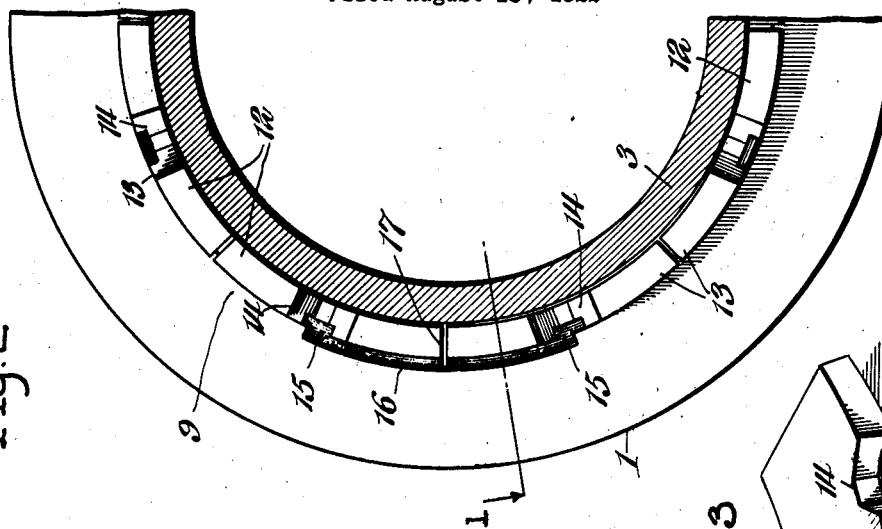
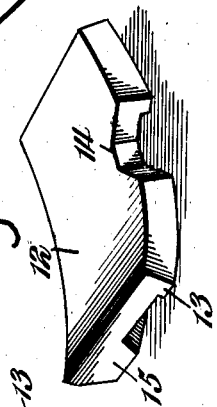
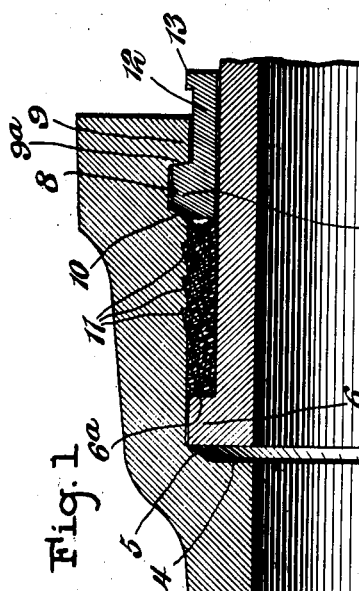
WITNESSES
Harry Y. Carson
INVENTOR
BY
ATTORNEY Patented June 15, 1926.

1,588,444

UNITED STATES PATENT OFFICE.

HARRY Y. CARSON, OF BIRMINGHAM, ALABAMA, ASSIGNOR TO AMERICAN CAST IRON PIPE COMPANY, OF BIRMINGHAM, ALABAMA, A CORPORATION OF GEORGIA.

PIPE JOINT.

Application filed August 18, 1922. Serial No. 582,724.

This invention relates to pipe joints.

The object is to provide means for joining the two coacting ends of adjacent sections of cast iron pipe of the bell and spigot type for use in high pressure pipe lines by the introduction of resilient packing in the socket or space between the inner walls of the bell and the spigot, and by the application of a positively locked sectional gland ring in the mouth of the bell to abut the packing and prevent outward movement of the latter in resistance to any tendency of the pipe sections to separate due to high internal pressure of the fluid being conducted through the pipe line.

Another object is to provide a joint which may be quickly and easily made in the trench or on the surface of the ground, the said packing and the locking ring being readily applicable to the spigot end of the pipe after the same has been properly applied to the bell end and easily secured in place to hold the joint together to prevent leakage, the component parts of the joint being manufactured by simple casting processes and so shaped and proportioned as to obviate the necessity for any machine work on the same to insure their proper fitting and co-action.

This is a companion application with one filed of even date herewith, wherein the locking means for the joint embodies threaded members interposed between the coacting bell and spigot ends.

A full and complete understanding of the invention may be obtained from a consideration of the following detailed description, taken in connection with the accompanying drawing forming a part of this specification; it being understood that while the drawing shows a practical form of the invention, the latter is not confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a longitudinal sectional view through a pipe joint constructed in accordance with the invention;

Figure 2 is a transverse sectional view through a portion of the spigot end and showing the coacting bell end and the locking ring in elevation;

Figure 3 is a detail perspective view of one of the segments comprising the locking ring.

The invention is designed primarily for use in oil fields and other similar places where fluids are to be conveyed under high pressure, the pipe line sometimes being laid in a trench and more often on the surface of the ground and where great strength in the pipe itself and in the joints is required to withstand the strain and to permit flexing of the line, due to buckling or crawling from interior forces or to expansion or contraction due to temperature changes, without bursting of the pipe or leakage at the joints.

By the use of pipe sections made from a special high grade of iron cast to produce sections having bell and spigot ends in accordance herewith, the same is adapted for use in place of the expensive steel or wrought iron pipe sections having screwed or flanged and bolted joints now in general use in high pressure service and which quickly corrode and break and often require replacement of the entire line.

In the use of the herein disclosed pipe joint, which is designed for use in high pressure pipe lines, these disadvantages are avoided, and a simple and economical pipe joint has been provided which may be readily manufactured by a single casting process, the bell and spigot ends having interfitting parts formed integrally therewith and adapted to be assembled in the trench or in the field in conjunction with a separable ring composed of simple segments, after the packing, formed of some resilient material, has been properly applied in position, so that the pipe sections, together with the locking or retaining means, may be easily shipped, handled and located in position at the scene of operations without the danger of disarranging, damaging or losing any of the parts of the joint, as often happens where many of the so-called prepared joints are employed.

Efforts have been made to employ cast iron pipe lines for conveying fluids under high pressure, the joints being made in the usual manner, but neither the ordinary cast iron pipe nor the ordinary joints have been found capable of standing the strain and, as a substitute, steel pipe having screwed, flanged or welded joints have been tried but without great success by reason of the effects of corrosion and the action of acids.

The pipe and joint of the present invention are designed to overcome these defects by forming the pipe of a special high grade iron having the tensile strength to withstand the pressure strains and to resist corrosion, etc. and by providing a joint having packing so applied and arranged as to be pressed or calked by the internal pressure of the fluid conveyed by the pipe line and to maintain tight joints under all conditions.

Referring to the drawing there is illustrated the bell end 1 of a cast iron pipe section having the customary exterior contour, and it is to be understood that neither the shape, size, nor proportions are obligatory, as the improved joint may be used on all sizes of pipe lines employing pipe sections of this kind.

The bell end 1 is provided with a socket 2, whose circular wall is formed on a diameter somewhat larger than the exterior diameter of the spigot end 3 of the pipe, which, of course, is the same as the diameter of the body of the pipe. The socket 2 terminates at its inner end, in a shoulder 4 arranged perpendicularly to the longitudinal axis of the pipe sections when the latter are placed in alignment, and the said shoulder is joined to the walls of the socket by a bevelled wall 5 intersecting the corner thereof.

The terminal of the spigot end 3 is provided with an integrally formed bead 6, rectangular in cross section to produce a straight, flat end wall entirely around the pipe, the opposite face 6ª of the bead 6 being perpendicular to the axis of the pipe to provide a flat shoulder or abutment for the inner end of packing 7, which is wrapped and calked around the spigot end 3, after the same has been introduced into the socket 2, with the outer angle of the bead 3 abutting against the bevelled wall 5 of the socket adjacent to where the wall of the latter joins said bevelled portion, as clearly shown in Figure 1.

The outer end of the socket 2 is provided with an annular enlargement 8, spaced from the end of the bell, thus producing an overhanging, circular flange 9 whose outer wall is flush with the face of the end of the bell, and whose inner wall 9ª is slightly flared in an outward and rearward direction, as shown in Figure 1.

The overhanging flange 9 where joined to the mouth of the bell is thus strengthened by reason of the increasing width of the same outwardly, so as to more effectually resist any prying or wedging action of the inserted spigot end when under flexing strains.

The internal annular wall of the circular flange 9 is co-extensive or in alignment with the wall of the socket 2, and the socket enlargement 8 produces an interior shoulder 10, bevelled or inclined in an opposite direction to the inner wall of the flange 9, and located well within the mouth of the bell and providing a space between the same and the outer wall of the annular, terminal bead 6 on the spigot end of the adjacent pipe section, for the said packing 7, the length of said space being substantially equal to half the depth of the socket.

The packing 7 which may consist of hemp, jute, flax, asbestos, rubber or other flexible and compressible material, is adapted to be caulked into said space and abut against the bead 6, and may initially extend somewhat into the socket enlargement 8, the inner wall of the socket beyond the shoulder 10 and adjacent thereto being provided with a plurality of annular grooves 11, which are V-shaped in cross section, the outer walls 11ª of the same being arranged more nearly perpendicular to the longitudinal axis of the pipe sections than the inner walls thereof, said inner walls facilitating the entrance of the packing material into the socket when being calked and which is forced into the grooves, and said outer walls act as abrupt abutments to retard any outward movement of the packing during the calking operation.

A gland ring is formed by a series of segmental, arcuate sections or retaining keys 12, which are adapted to be placed in surrounding relation to the spigot end 3, and each segment or section is formed on the arc of a circle to agree with the external diameter of the spigot end, the thickness of the sections being such as to fit between the inner diameter of the outer annular flange 9 and the outer surface of the spigot. The width of each section is such as to extend from adjacent to the bevelled interior shoulder 10 outwardly and beyond the face of the bell where they are provided with marginal, radially disposed outstanding flanges 13, each being provided with a cut-out portion 14 intermediate the ends of the section, and having at their inner ends a radially disposed outstanding flange 15 fitting within the enlargement 8 of the socket, the front face of the flange 15 abutting against the inner face of the overhanging flange 9 of the bell, the inner ends of the sections or retaining keys bearing against the uneven surface of the packing, which results from the calking and preventing bodily longitudinal movement of the latter by reason of such engagement. The inner face of each section or key is inclined to agree with the inclination of the shoulder 10, and to provide an extended, arcuate nose in alinement with the outer end of the packing chamber in order to contact with the packing.

The mouth of the socket of the bell is provided with an entrance opening 16 slightly greater in length than the length of one of the sections, and formed by omitting the flange 9 for that distance at one point around its circumference, as shown in Figure 2, the said opening 16 being provided for the purpose of introducing the segments one at a time, therethrough, so that the flange 15 of each may be located behind and against the flange 9; and as each segment is thus placed in position against the outer surface of the spigot end and in alinement with the said opening, the segment may be moved bodily through the opening, and, by means of the recess or cut-away portion 14, the same may be slid, by a tool or otherwise, circumferentially around on the spigot until the open end of the socket is filled and the segments form substantially a continuous ring. When thus arranged, the packing is held entirely around its outer end, and the joint between two of the segments may be located at the center of the entrance opening 16 as indicated at 17 in Figure 2 and it will be seen that the entire ring is held against any outward movement within the mouth of the socket, by the engagement of the flange 9 with the flanges 15.

The entrance opening 16 readily permits the withdrawal of the segments or keys when it is desired to dismantle the pipe line, as is frequently done and is necessary especially in oil fields where the pipe line is laid on the surface, the outer ribs or flanges 13 of the keys facilitating such withdrawal by affording means for pulling the same, ample space being provided in the annular enlargement of the socket 8 for turning the keys to aline with said opening 16.

When the pipe joint as thus constructed and assembled, is subjected to high pressure from the fluid being conducted by the pipe line, the said pressure will be exerted through the space between the end of the spigot end including the bead 6 and the inner shoulder 4 of the bell, the said pressure forcing through the space due to the irregularities in the castings between the outer face of the terminal bead 6 and the bevelled wall 5 of the inner portion of the socket, and forcing the packing 7 in a forward direction. This force compacts the packing further into the annular grooves 11 and against the inner ends of the series of segments or keys 12 forming the positive locking ring at the outer end of the socket. Only a minimum amount of longitudinal movement of the packing under such pressure is necessary to cause the same to be deflected inwardly against the exterior wall of the spigot by the action of the inclined surfaces 11ª of the annular grooves on said packing.

It will thus be seen that any fluctuations in the pressure is taken care of by the packing, as the greater the pressure the greater the packing is compressed. The spigot end having a positive, solid bearing within the several segments at one point and likewise through the contact of the terminal bead 6 against the inner wall of the socket at a spaced point, is thus prevented from any material degree of flexing due to the settling of the pipe line, or from other external pressure or forces, and the pipe sections are maintained in longitudinal alinement. The bevelled wall 5 provides a surface for the outer angle of the internal bead 6 on the spigot to contact with, at all time, even if the pipe sections are flexed, and the spaces provided around all parts allows of such flexing before becoming metalbound. The simplicity of the joint and its freedom from complicated parts, nuts, bolts, threads, etc., renders the joint capable of being cheaply manufactured and readily and quickly installed or dismantled.

What is claimed is:—

1. In a pipe joint of the class described, including coacting bell and spigot ends of two adjacent pipe sections, a radially disposed outstanding bead formed on the terminal of the spigot end, said bell end being provided with a socket terminating in an inner, annular shoulder, said socket being adapted to receive the bead on the spigot and said bead having its peripheral edge loosely contacting with the wall of the socket to slide longitudinally along the same, an annular chamber provided in the socket in spaced relation to the end of the bell to provide an outer overhanging flange, a portion of which is cut-away to form an entrance opening, a removable locking ring surrounding the spigot at the mouth of the socket and formed in independent sections, said sections having circumferentially-alined flanges and adapted to be passed through said entrance opening and received and held in said chamber by the engagement of the flanges of the ring sections with the overhanging flanges of the chamber, and a flexible packing disposed around the spigot and within the socket and contacting with the inner wall of the bead on the spigot and also with said locking ring, whereby the pressure of the fluid in the pipe acts upon the rear end of the spigot and the bead to move the spigot and the bead to uniformly compress the packing.

2. In a pipe joint of the class described, including coacting bell and spigot ends of two adjacent pipe sections, a radially disposed outstanding annular bead formed on the terminal of the spigot end, said bell end being provided with a socket terminating in an inner, annular shoulder arranged perpendicular to the axis of the pipe and joined to the inner walls of the socket by an inclined wall, said bead loosely fitting the socket in advance of the inclined wall so as to allow the pressure of the fluid in the pipe to act against the rear end of the spigot, and said bead bearing against said inclined wall and also loosely contacting at its peripheral edge with the wall of the socket, flexible packing disposed around the spigot end and within the socket and contacting with the inner wall of said bead, and means surrounding the spigot end and engaging with the socket of the bell in advance of the packing and bearing against the latter to hold the packing against the bead.

3. In a pipe joint of the class described including coacting bell and spigot ends of two adjacent pipe sections, a socket formed in the bell end and terminating in an inner shoulder and having near its outer end a circumferential chamber or enlargement provided with an entrance opening, and also having a series of spaced circumferential grooves beyond the inner wall of the enlargement, said grooves having inclined inner walls to facilitate calking of the packing and outer walls which are substantially perpendicular to the axis of the pipe to cause the packing to hug the spigot when forced outwardly by the internal pressure, an annular terminal bead formed on the spigot end and adapted to enter the socket, said bead being spaced from the inner shoulder and loosely fitting the socket in the bell, flexible packing surrounding the spigot within the socket and abutting the bead and filling the grooves, and a series of segmental sections forming a locking gland ring, each section having an inner flange located within the enlargement and abutting the packing and said sections extending outwardly beyond the face of the bell, whereby the pressure of the fluid in the pipe is caused to act against the rear end of the spigot and also against the packing to compress the latter.

4. In a pipe joint of the class described, including coacting bell and spigot ends of two adjacent pipe sections, a radially disposed outstanding annular bead formed on the terminal of the spigot end, said bead being rectangular in cross section, said bell end being provided with a socket terminating in an inner annular shoulder arranged perpendicular to the axis of the pipe, said bead loosely fitting the socket and bearing against the latter and spaced from the inner, annular shoulder, an annular enlargement provided in the socket in spaced relation to the end of the bell to form an outer overhanging flange flush with the outer face of the bell, said flange having a cut-away portion to provide an arcuate entrance opening communicating with said enlargement, a locking ring surrounding the spigot at the mouth of the socket and formed of arcuate sections which are introducable through the said entrance opening, the sections having circumferentially alined flanges located in the enlargement of the socket and bearing against the inner face of the said overhanging flange, and a flexible packing around the spigot and within the socket and contacting with the inner ends of said ring sections and the bead on the spigot end, whereby the pressure of the fluid in the pipe is caused to act against the rear end of the spigot and also against the packing to compress the latter.

5. In a pipe joint of the class described, comprising coacting bell and spigot ends of two adjacent pipe sections, a radially disposed outstanding annular bead formed on the terminal of the spigot end, said bell end being provided with a socket terminating in an inner annular shoulder arranged perpendicular to the axis of the pipe, said socket being adapted to receive the bead on the spigot with the said bead abutting the wall of the socket, an annular enlargement in the socket in spaced relation to the end of the bell to provide an outer overhanging flange flush with the outer face of the bell, said flange having a cut-away portion to provide an entrance opening communicating with the enlargement, the inner and outer walls of the enlargement being oppositely tapered, a locking ring surrounding the spigot end at the mouth of the socket and formed of sections which are introducable through the said entrance opening and have their outer ends projecting beyond the end face of the bell, and provided with circumferentially alined flanges located in the enlargement of the socket and bearing against the inner wall of the said overhanging flange, said socket having a series of circumferentially V-shaped grooves located between the enlargement and the inner end thereof, and a flexible packing arranged around the spigot end and within the socket and filling the V-shaped grooves, said packing contacting with the inner ends of said ring sections and the bead on the spigot.

6. In a pipe joint of the class described, including coacting bell and spigot ends of two adjacent pipe sections, a socket formed in the bell and terminating in an inner shoulder and having near its outer end a circumferential chamber or enlargement provided with an arcuate entrance opening; and also a series of spaced circumferential grooves beyond the inner wall of the enlargement, an annular terminal bead formed on the spigot end and adapted to enter the socket and abut the inner wall of the same, flexible packing surrounding the spigot within the socket abutting the bead and filling the grooves, and a series of arcuate sections forming a locking gland ring, each section having an inner flange located within the enlargement and abutting the packing, and said sections extending beyond the face of the bell and provided with means to facilitate their turning around the spigot, after said inner flanges have been introduced through the said inlet opening, to constitute a continuous abutment for the outer end of the packing.

7. In a pipe joint of the class described, including coacting bell and spigot ends of two adjacent pipe sections, a socket formed in the bell and terminating in an inner shoulder and having near its outer end a circumferential chamber or enlargement provided with an arcuate entrance opening, and also a series of spaced circumferential grooves beyond the inner wall of the enlargement, said grooves having inclined inner walls to facilitate calking of the packing and outer walls more nearly perpendicular to the axis of the pipe to cause the packing to hug the spigot when forced outwardly by the internal pressure of the fluid conveyed through the pipe line, an annular terminal bead formed on the spigot end and adapted to enter the socket and abut the wall of the same, flexible packing surrounding the spigot within the socket abutting the bead and filling the grooves, and a series of segmental sections forming a locking gland ring, each section having an inner flange located within the enlargement and abutting the packing, and said sections extending beyond the face of the bell and there provided with means to facilitate their turning around the spigot after said inner flanges have been introduced through the said inlet opening to constitute a continuous abutment for the outer end of the packing, said sections having outstanding, arcuate flanges at their outer ends to facilitate their removal from the mouth of the bell.

In testimony that I claim the foregoing as my own, I have hereto affixed my signature.

HARRY Y. CARSON.